June 23, 1936.                L. BEASLEY                2,044,871
                              HAND PLANTER
                           Filed Oct. 10, 1935
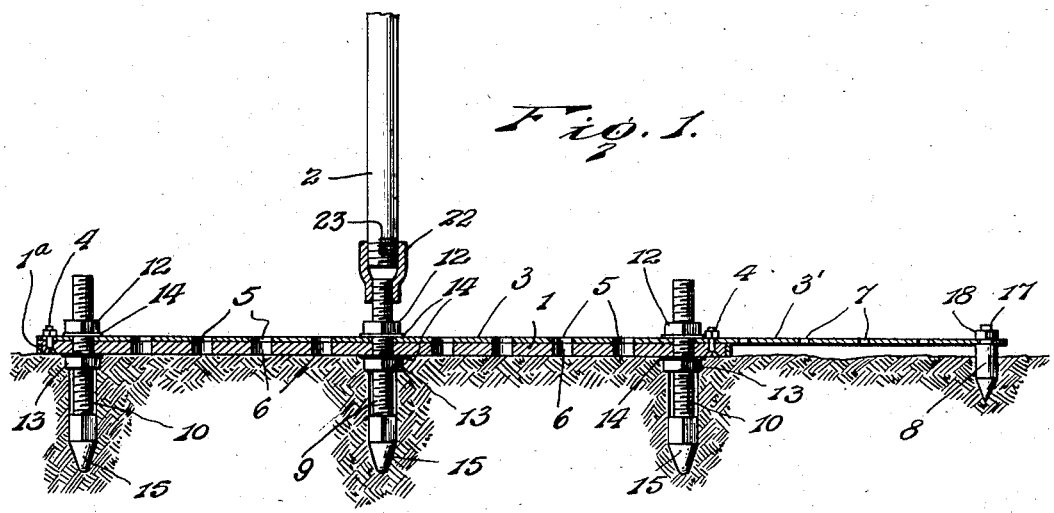
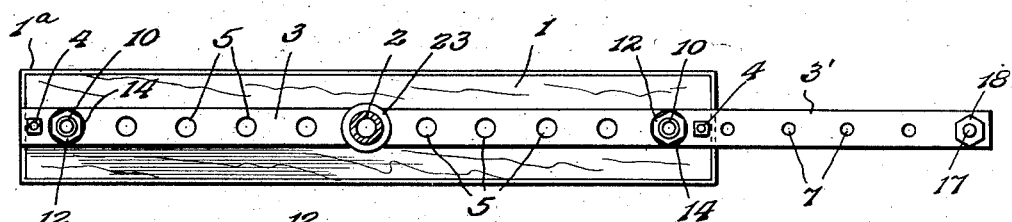
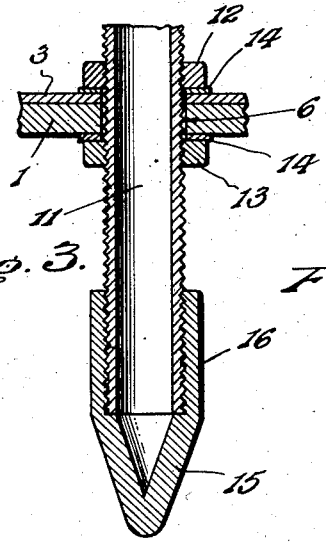
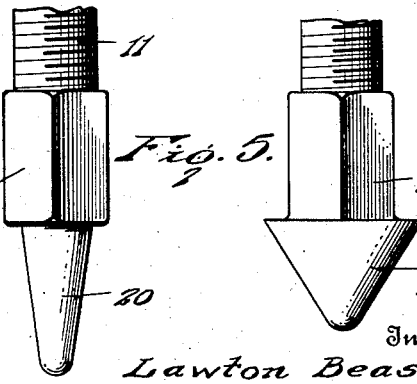
Inventor
Lawton Beasley.
By Lacey & Lacey,
Attorneys Patented June 23, 1936

2,044,871

UNITED STATES PATENT OFFICE 2,044,871

HAND PLANTER

Lawton Beasley, Bishopville, S. C.

Application October 10, 1935, Serial No. 44,426

6 Claims. (Cl. 55—67)

This invention relates to a hand planter particularly adapted for use when setting out tobacco, cabbage and other plants which must be transplanted after being grown in a bed and set into the ground in rows and in proper spaced relation to each other in the rows.

One object of the invention is to provide a planter of the hand operated type which is so constructed that prongs forming part of the device may be forced into the ground in alinement with each other and thus form openings which are in proper spaced relation to each other and of such depth that the young plants may be easily set into the openings formed in the soil and the soil then pressed about the plants.

Another object of the invention is to provide a device of this character of such construction that the earth penetrating prongs may be mounted in desired spaced relation to each other longitudinally of a supporting strip and all so adjusted to cause them to penetrate the ground a desired distance according to the depth at which the plants should be set.

Another object of the invention is to provide the device with a strip which not only serves as a carrier for the penetrating prongs, but also as means for compressing the soil about openings formed therein to receive plants and thus provide the soil with flattened surface portions about the plant receiving openings.

Another object of the invention is to provide the device with an improved gage carried by the prong-supporting strip and serving to form an indentation in the soil when the prongs are forced into the same to form the plant receiving openings or pockets and thus indicate the proper position for placing the device to form other plant receiving pockets or openings after the plants have been set into the openings just formed.

The invention is illustrated in the accompanying drawing, wherein

Figure 1 is a view showing the improved hand planter partially in longitudinal section and partially in elevation.

Figure 2 is a top plan view of the planter.

Figure 3 is an enlarged sectional view taken vertically through the central penetrating prong and illustrating the manner in which the prongs are adjustably secured to the prong carrying strip and also the manner in which the tip is connected with the shank of the prong.

Figure 4 is a fragmentary view in elevation of a modified form of earth penetrating tip.

Figure 5 is a view similar to Figure 4 showing another modified form of tip.

This improved planter consists, briefly, of a plurality of earth penetrating prongs carried by and depending from a flat plate or head 1 which may be formed of wood, metal, or any other desired material and is of greater length than width, a handle 2 being provided by means of which the device may be carried and pressure applied to force the prongs into the ground. If the head is formed of wood, a bordering frame 1a formed from a strip of metal and secured by screws may be employed to prevent warping or cracking of the head. A reinforcing strip 3 of metal extends longitudinally of the plate or head 1 upon the upper face thereof and is of greater length than the head so that a portion 3' of this strip projects at one end of the head, as shown clearly in Figures 1 and 2. Bolts 4 secure the strip 3 to the head 1 and openings 5 and 6 are formed in the strip and head to register when the strip is secured to the head. The extended portion 3' of the strip is formed with openings 7 which are of less diameter than the openings 5 but are spaced from each other approximately the same distance as the openings 5, as shown in Figure 2. By this arrangement, the prongs carried by the head may be spaced from each other desired distances longitudinally of the head and a marker 8 may also be secured to the extended end portion of the strip in desired spaced relation to the end of the head.

Referring to Figure 1 it will be seen that one of the penetrating prongs, which is indicated by the numeral 9, is located midway the length of the head and other prongs 10 disposed in spaced relation to the intermediate prong. Each of the prongs is formed as shown in Figure 3 and consists of a tubular shank 11 which is threaded from its upper and lower ends, the upper end portion of the shank being passed through the alined openings 5 and 6 of the strip and head and carrying nuts 12 and 13 which, when tightened, will secure the prongs in vertically adjusted positions. It will thus be seen that the shanks may be vertically adjusted through the head and the nuts then tightened so that the prongs will extend downwardly from the head a desired distance to form openings or pockets in the ground of a desired depth according to the type of plants which are to be set in the ground. Washers 14 are used to prevent wear when the nuts are tightened. Penetrating points or tips 15 which are hollow and formed with internally threaded walls 16 are screwed upon the threaded lower end portions of the shanks 11 so that when the device is in use, the prongs may be very easily forced into the ground and form openings or pockets of such diameter that the plants may be very easily set into the pockets. It should also be noted that since the points have their walls screwed upon the lower end portions of the shanks, they will form openings or pockets in the ground of such diameter that the prongs may be easily withdrawn without likelihood of the each being disturbed and falling into the pockets to fill the same when the device is removed. Attention is also called to the fact that the tips have blunt and rounded lower ends and, therefore, pockets formed in the ground will have rounded bottoms for engagement by roots of plants set into the pockets.

The marker 8 is similar in contour to the points 15 but of slightly greater length and instead of being hollow is solid and at its upper end carries a reduced and threaded stem 17 which is passed through one of the openings 7 and carries a securing nut 18. It will thus be seen that the prongs 10 may be shifted along the head or plate 1 and passed through selected openings of the plate and strip which will dispose them in desired spaced relation to the central prong 9 and the marker 8 also shifted along the extended portion 3' of the reinforcing strip and secured in a desired opening 7 which will dispose it in spaced relation to the adjacent prong 10 a distance corresponding to the distance between the prong 9 and the prongs 10.

Instead of forming the tips for the prongs 9 and 10, as shown in Figures 1 and 3, a tip such as shown in Figure 4 may be used. In this embodiment of the invention, the tip consists of a socket or cap 19 which is screwed upon the threaded lower end portion of a shank 11 and has a reduced and tapered lower portion 20 in order that when it is forced into the ground a pocket will be formed having a rounded bottom. This type of tip is used when setting out plants having small roots. The tip 21 illustrated in Figure 5 is formed with an enlarged and downwardly tapered lower portion 22' and is used when setting out strawberry plants and the like which have wide roots and, therefore, require a wide pocket in the ground to prevent crowding of the roots.

When this device is in use, the prongs 9 and 10 are secured through the alined openings of the head and reinforcing strip with the prong 9 at the center of the head and the prongs 10 spaced a predetermined distance from the prong 9. The marker 8 will be secured in a selected opening 7 to space it the proper distance from the adjacent prong 10 and when the nuts are tightened the prongs and the marker will be firmly secured in proper spaced relation to each other and with the prongs 9 and 10 projecting from the under face of the head or plate 1 sufficiently to form pockets in the ground of a desired depth. The handle 2 has its lower end threaded and screwed into the upper end of the coupling 22 where it is secured by a pin 23. The coupling has its reduced lower end portion screwed upon the shank of the center prong 9 and, therefore, the handle will be detachably connected with the center prong in alinement therewith. This handle will be of such length that a person may dispose the tips of the prongs in engagement with the ground while standing and then apply pressure to force the prongs into the ground until the head or plate makes contact with the soil. Continued pressure will be exerted to cause the soil to be pressed flat and, therefore, when the device is drawn upwardly, openings or pockets will be formed in the ground which are in alinement with each other and of the same depth and surrounded by an area of flattened and somewhat compressed soil. Therefore, the plants to be set out may be easily placed into the pockets formed in the soil and the soil pressed about the plants. During formation of the pockets, the marker 8 will form a shallow indentation in the soil and after plants have been set in the pockets formed by the prongs 9 and 10, the prong 10 at the opposite end of the head from the extended portion 3' of the reinforcing strip may be engaged in the indentation formed by the marker. Therefore, when pressure is again applied, the set of openings or pockets formed will not only be in proper spaced relation to each other, but also properly spaced from the pockets previously formed. While the device has been illustrated with three prongs, it will be understood that any number desired may be provided.

Having thus described the invention, what is claimed as new is:

1. In a hand planter, a body formed from an elongated flat plate, a reinforcing strip extending longitudinally of said body and secured against the upper face thereof with a portion projecting from one end of the body, the body and strip being formed with registering openings and the extended portion of the strip also having openings formed therein, prongs depending from the body and having threaded upper end portions extending through the registering openings of the body and strip, nuts threaded upon the prongs above and below the body and strip and when tightened serving to hold the prongs in vertically adjusted positions, a marker under the extended portion of said strip having a stem at its upper end engaged through an opening of the strip and carrying a securing nut whereby the marker will be detachably secured to the strip, and a handle above the body.

2. A planter comprising an elongated flat body formed with openings spaced from each other longitudinally of the body, a reinforcing strip secured against the upper face of the body longitudinally thereof and formed with openings registering with openings of the body, said strip having a portion projecting from the end of the body and formed with openings spaced from each other longitudinally of the strip, a marker detachably secured through a selected opening in the projecting portion of the strip and depending from the strip, a prong secured through an opening midway the length of the body, other prongs secured through selected registering openings of the body and strip in predetermined spaced relation to the center prong, said prongs being removably secured through the openings and adjustable longitudinally of themselves whereby they will project downwardly from the body a predetermined distance, and a handle over the body.

3. A planter comprising an elongated body having openings formed therein in spaced relation to each other longitudinally of the body, prongs depending from the body with their upper portions extending through openings of the body and detachably secured with portions projecting upwardly from the body, one prong being midway the length of the body and other prongs being spaced from the first prong longitudinally of the body, and a handle detachably connected with the upwardly projecting upper end portion of the first prong.

4. A planter comprising an elongated body formed with openings spaced from each other longitudinally of the body, prongs each having a tubular shank formed with an externally threaded upper end portion extending through an opening of the body, securing nuts threaded upon the shank one above and the other below the body and shiftable along the shank into position to engage the body for securely but detachably holding the shank in engagement with the body and in a vertically adjusted position, a handle disposed over the upper end of the shank of one prong, and means for connecting the lower end of the handle with the shank of the prong.

5. In a planter, a head formed with spaced openings, and prongs depending from the head and each having a shank formed with threaded upper and lower end portions, the upper end portion of the shank being passed through an opening of the head, securing nuts threaded upon the upper end portion of the shank one above and the other below the head gripping the head and securely holding the shank to the head and permitting vertical adjustment of the shank, and a cap for the lower end of the shank spaced from the lower nut and shaped to provide a penetrating point.

6. A planter comprising an elongated flat body formed with openings spaced from each other longitudinally of the body, a reinforcing strip for the body formed with openings registering with openings of the body, said strip having a portion projecting from one end of the body and formed with openings spaced from each other longitudinally of the strip, a marker detachaby secured through a selected opening in the projecting portion of the strip and depending from the strip, prongs secured through selected registering openings of the body and strip in predetermined spaced relation to each other, and a handle over the body.

LAWTON BEASLEY.